United States Patent Office 3,322,638
Patented May 30, 1967

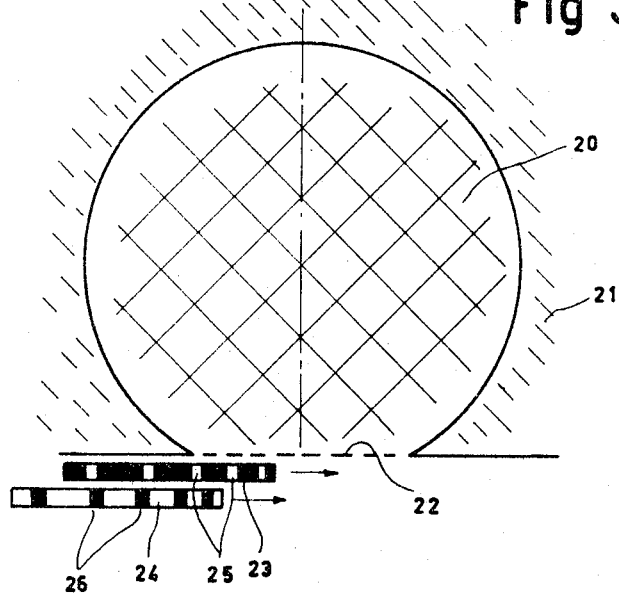
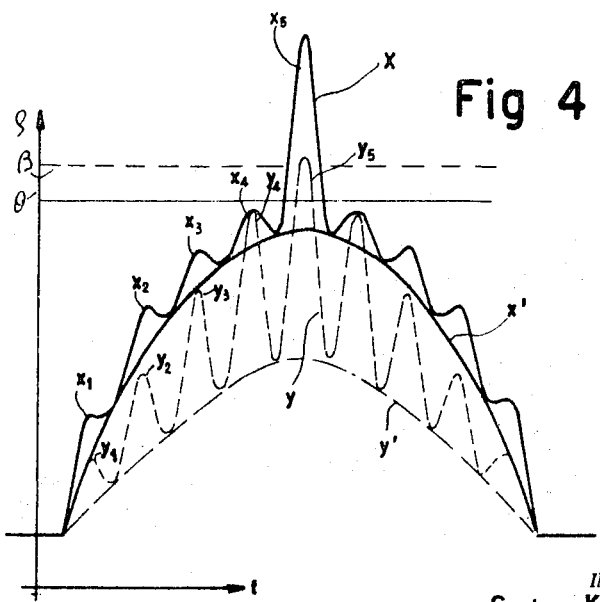

3,322,638
NEUTRON SOURCE FORMED AS A FAST
PULSED REACTOR
Gustav Kistner, Gavirate, Herbert Meister, Ispra, and
Victor Raievski, Varese, Italy, assignors to European
Atomic Energy Community—Euratom, Brussels, Belgium
Filed July 10, 1964, Ser. No. 381,637
Claims priority, application Germany, Aug. 15, 1963,
E 25,344
4 Claims. (Cl. 176—33)

The present invention relates to a neutron source in a reflector, formed as a fast pulsed reactor with a neutron outlet window through the reflector and two synchronized screens movable one over the other in front of the window, the screens being made of reactivity increasing materials for pulsing the reactivity. Neutron impulses of high density and very short duration are needed for a number of neutron physical measurements.

The reactivity of the above-described neutron source is pulsed in two steps: in a first step by means of a screen up to near the critical point of the reactor (pre-pulse), and simultaneously in a second step by means of another screen above the prompt critical point of the reactor (excess pulse). While the screen for the excess pulse determines the neutron impulse width, the screen for the pre-pulse determines the impulse frequency. Impulse width and impulse frequency are thus coupled. From the viewpoint of kinematics, the screen for the excess pulse moves at constant basic velocity while the screen for the pre-pulse moves at a speed different from said constant speed and being principally much smaller.

The allowable impulse amplitude of the neutron pulse for certain measurements should if possible be less than 40 μsec. The duration of the pre-pulse lies, for example, at 600 μsec. Its zero level is situated for about 4–5 below $k_{eff}=1$ for the reason of maintaining a low reactivity basis level ($\beta$ is the number of delayed neutrons per fissioned neutron). Correspondingly, when pulsing the reactor, the pre-pulse is only carried up to the vicinity of the critical point. The excess pulse then superposes itself on the pre-pulse and carries the reactivity over $k=_{eff}$ 51.0064. An excess value of 1.5$\beta$ is thus aimed at.

From the expression for half value width $\theta$ of the neutron impulse, it is found that the width as desired becomes small when the life $\tau$ of the neutrons as well as the duration of the reactivity pulse $\Delta t$ is small and the excess reactivity $em$ above the line $\beta$ over the prompt critical point is large. The dimension $\tau$ is advantageously determined by the choice of the reactor type as a fast reactor. The dimensions $\Delta t$ and $em$ are coupled by constructional characteristics on the reactor window and the screens and can be influenced by the kinematics of the latter.

In the above-described pulsing device which has been proposed by others and which is superior at high impulse outputs to the known Russian system "IBR DUBNA," of similar kinematic construction, it is expected that values of between 40–50 μsec. for the neutron impulse width $\theta$ are reached.

An object of the present invention is to further improve the above-mentioned pulsing apparatus with the purpose of still further decreasing the value for $\theta$. This object is obtained in a simple manner in accordance with the invention by providing the screen for the pre-pulse with at least one small slot for the passage of the neutrons through the window, and providing reactivity increasing material in the screen for the excess pulse only in the zone defined by the slot when the screens overlap. In this manner the excess pulse is superposed over the pre-pulse with substantially smaller impulse width $\Delta t$ than in the case of screens without opening. Neutron impulses widths of 40 μsec. are possible at present. It is possible to operate in the neighborhood of the value of 40 μsec. aimed at for neutron time of flight measurements.

In the construction of the screen for the excess pulse, having reactivity increasing material limited to a small zone, care must be taken that the reflectivity of the screen comes close to the saturation value and that the reactivity modulation of the above-mentioned zone required for developing a neutron pulse of determined density is also obtained. In this last instance, it is necessary to use a screen with several slots. An installation of this type is characterized in that the screen for the pre-pulse is provided with several slots or openings arranged sequentially in the direction of movement of the screen and that the screen for the excess pulse is similarly provided with zones of reactivity increasing material at the overlap locations, with the characteristic, however, that the spacing from slot to slot or from zone to zone increases (or decreases) in such a way that only when the screens overlap fully are all the slots in register with the zones, but in all other positions at most only one slot is in register. There is thus obtained sufficient active screen surface for the reactivity lift but the actual excess pulse only occurs in the position of full overlap. The pulse has a duration given by the width of one single slot. Thereby the size of the reactivity modulation is independent of the duration of the reactivity impulse; in other words it is possible with a given amplitude of reactivity lift to vary its amplitude with the number of slots.

The above-mentioned features are hereinafter explained with reference to the drawings which also show schematic embodiments of the invention.

In the drawings:

FIG. 3 is the preferred screen arrangement with non-equidistant slots in the screen for the pre-pulse, and FIG. 4 is a simplified reactivity time graph for the arrangement according to FIG. 3 completed with a graph for a screen with equidistant openings.

Figure 1:
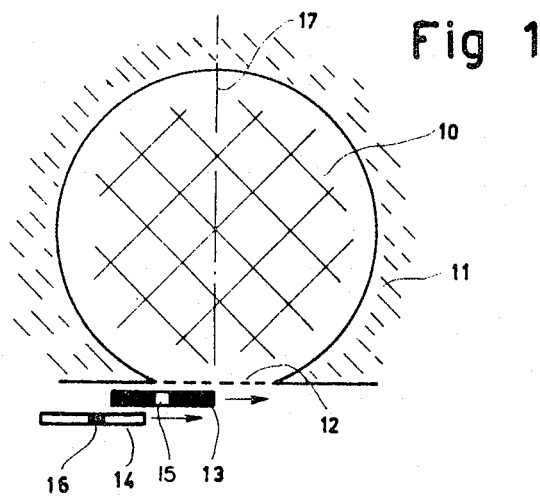
FIG. 1 is a screen arrangement with an individual slot in the screen for the pre-pulse.

In FIG. 1 reference numeral 10 indicates the core of the fast reactor used as pulsed neutron source, 11 the reflector zone, 12 the neutron outlet window, 13 the screen for the pre-pulse, and 14 the screen for the excess pulses. The screens are moved, for example, on circular tracks in planes parallel to the window by special drives (not shown).

A small slot 15 is provided through the screen 13 for the passage of neutrons through the window. The reactivity increasing material in the screen 14 for the excess pulse is only provided in the zone 16 defined by the slot 15 when the two screens fully overlap. The slot and the zone have preferably a rectangular or trapezoidal shape with the short side of the rectangle in the direction of movement. The reactivity increasing material that can be used may, for example, be beryllium, also a fissionable material. The screen 13 consists entirely of such material and its thickness must be selected in such a way that the reflectivity comes close to the saturation value.

Figure 2:
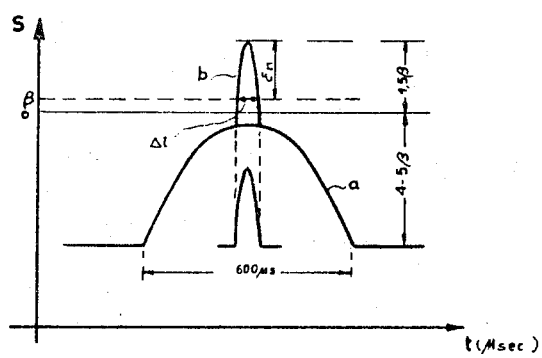
FIG. 2 is a simplified reactivity time graph corresponding to the arrangement of FIG. 1.

When in operation the slot 15 registers with the zone 16 in the axis of symmetry 17, the reactivity course follows the curve shown in FIGURE 2. The abscissa gives $t$, the time, in μsec. and the ordinate $\rho$, the reactivity, as a parameter. The curve $a$ shows the course of the reactivity pre-pulse. It begins at 4→5$\beta$ below the critical point of the reactor ($\rho=0$) and has its maximum below the line of criticality and lasts about 600 μsec. The curve $b$ shows the reactivity excess impulse given by the screen 14 at the moment of symmetrical overlap.

It is essential that the width of the excess impulse at the foot be substantially smaller than that of the pre-pulse. With screens having no passage slot, these widths would be larger. The smaller foot width thus leads to a small value of $\Delta t$. Thereby in accordance with the invention the duration of the neutron impulse is decreased and this by more than half with respect to screen arrangements having no slots.

In FIG. 3 the reactor core, the reflector, and the window are indicated, respectively, at 20, 21 and 22. The screen for the pre-pulse is indicated at 23 and that for the excess pulse at 24. In the screen 23 the slots 25 which are of equal width are disposed non-equidistantly and the zones 26 of reactivity increasing material in the screen 24 are correspondingly spaced. Assuming that the screen 23 is at rest in front of the window, if the screen 24 is moved from the left, the zones begin to register one after the other with the slots. Registration, however, at any one moment is only for one slot (the position of which varies) as long as the screens are not in total overlap position. In the overlap position all the slots are covered.

The corresponding course of the reactivity curve is shown in the graph of FIG. 4 in which the abscissa and ordinate correspond to those of FIG. 2. The base curve $X'$ shows the action of the pre-pulse by the screen 23 and the humps $X_1$ to $X_5$ show the excess action of the zones of the screen 24. The number ($n=5$) of humps and their staggered position correspond to the number of slots and their staggered position, in the screens. The hump $X_5$ which forms the actual excess impulse is $n$ times as large as the humps $X_1$ to $X_4$ which are of equal amplitude.

The drawing shows that the part of the impulse $X_5$ which can be used for the excess, i.e., the part above the line $\rho=0$ is quite large. It is in any case larger than in the case of screens with equidistant slots and zones. In these, with advancing relative movement of the screen for the excess pulse, the number of overlappings steadily increases by one. As a consequence, as shown by the dotted line curve $y$ in FIGURE 4, the amplitudes of the humps $Y_1$ to $Y_5$ increase steadily. Since the line $\rho=0$ may only be passed by the excess impulse in the yoke of the pre-pulse, the impulse height of $Y_5$ usable for the excess is substantially smaller than $X_5$.

We claim:
1. In a fast reactor used as a pulse neutron source wherein the reactor core is located in a reflector, said reflector provided with a neutron outlet window, a pre-pulse screen and an excess-pulse screen having synchronized movements and movable in overlapping relationship in front of the window, said screens composed of reactivity increasing materials for pulsing the reactivity, means to operate the pre-pulse screen to bring the reactivity up to the vicinity of the critical point and simultaneously to pulse the reactivity above the prompt critical point by movement of the excess-pulse screen; the improvement comprising means defining at least one small slot through the pre-pulse screen for the passage of the neutrons projecting through said window, the excess-pulse screen being formed of said reactivity increasing material only in the zone on said excess-pulse screen defined by the slot when the screens overlap.

2. The improvement according to claim 1, wherein there is provided a plurality of slots arranged in line in the direction of movement of the pre-pulse screen and a plurality of zones of reactivity increasing material similarly provided at the overlap locations in the excess-pulse screen, the distances from slot to slot and from zone to zone varying in such a way that upon full overlap of the screens all the slots are covered by the zones while in all other positions at most only one slot is so covered.

3. The improvement according to claim 2, wherein the slots are in the form of rectangular openings with the longest sides of all openings being parallel to each other.

4. The improvement according to claim 2, wherein the slots are in the form of trapezoidal openings with the longest sides of all openings being parallel to each other.

References Cited

UNITED STATES PATENTS 2,790,761    4/1957    Ohlinger _____ 176—33

CARL D. QUARFORTH, *Primary Examiner.*

L. DEWAYNE RUTLEDGE, *Examiner.*

H. E. BEHREND, *Assistant Examiner.*